(12) United States Patent
Grimes

(10) Patent No.: US 7,559,525 B2
(45) Date of Patent: Jul. 14, 2009

(54) CLAMP DEVICE FOR TEMPORARILY CLOSING FLEXIBLE PIPES WITHOUT PIPE WALL DAMAGE

(76) Inventor: Dennis L. Grimes, 14690 CR 230, Arp, TX (US) 75750

( * ) Notice: Subject to any disclaimer, the term of this patent is extended or adjusted under 35 U.S.C. 154(b) by 504 days.

(21) Appl. No.: 11/480,736

(22) Filed: Jul. 5, 2006

(65) Prior Publication Data

US 2007/0102658 A1   May 10, 2007

Related U.S. Application Data

(60) Provisional application No. 60/733,875, filed on Nov. 7, 2005.

(51) Int. Cl.
*F16K 7/04*   (2006.01)
(52) U.S. Cl. ............................... 251/9; 251/8
(58) Field of Classification Search ............ 251/4, 251/7, 8, 9
See application file for complete search history.

(56) References Cited

U.S. PATENT DOCUMENTS

| | | | |
|---|---|---|---|
| 628,391 A * | 7/1899 | Clarke ........................... 251/9 |
| 2,925,682 A | 2/1960 | Kravitch | |
| 3,203,421 A * | 8/1965 | Bialick ........................ 128/885 |
| 3,584,830 A | 6/1971 | Koehn | |
| 4,091,815 A | 5/1978 | Larsen | |
| 5,071,102 A * | 12/1991 | Gray .............................. 251/4 |
| 5,571,125 A | 11/1996 | Chadwick | |
| 5,579,561 A | 12/1996 | Smith et al. | |
| 5,653,481 A * | 8/1997 | Alderman .................... 285/363 |
| 5,864,927 A | 2/1999 | Liu | |
| 5,873,611 A * | 2/1999 | Munley et al. ............... 285/367 |
| 6,030,006 A * | 2/2000 | Lin ............................ 285/411 |
| 6,056,332 A * | 5/2000 | Foster ......................... 285/367 |
| 6,663,653 B2 | 12/2003 | Akerfeldt | |
| 6,708,377 B2 * | 3/2004 | Maunder ...................... 24/279 |
| 7,137,611 B2 * | 11/2006 | Aulicino ......................... 251/9 |
| 7,383,853 B2 * | 6/2008 | Welch et al. ........... 137/315.07 |
| 2002/0109355 A1 * | 8/2002 | Elliott ......................... 285/410 |
| 2006/0048818 A1 * | 3/2006 | Welch et al. ................. 137/269 |

* cited by examiner

*Primary Examiner*—John K Fristoe, Jr.
*Assistant Examiner*—Marina Tietjen
(74) *Attorney, Agent, or Firm*—Ronald B Sefrna

(57) ABSTRACT

A device for temporarily closing a flexible pipe against the flow of fluid through the pipe includes upper and lower jaw members pivotally connected at their first ends to receive and compress the pipe between the jaw members, with pipe engaging surfaces of the jaw members separated from each other to prevent excessive compression of the pipe. An elongate threaded rod is pivotally connected to the second end of the lower jaw member, to extend between bearing plates connected to and extending outwardly from the second end of the upper jaw member. A nut assembly is threaded onto the threaded rod to be received and tightened against the bearing plates to safely compress the pipe between the jaw members without damaging the pipe wall.

19 Claims, 8 Drawing Sheets

CLAMP DEVICE FOR TEMPORARILY CLOSING FLEXIBLE PIPES WITHOUT PIPE WALL DAMAGE

RELATED APPLICATION DATA

This application claims the benefit of U.S. Provisional Patent Application Ser. No. 60/733,875, filed Nov. 7, 2005, and titled "Clamp Device For Temporarily Closing Flexible Pipes".

FIELD OF THE INVENTION

The present invention generally relates to clamp devices for hoses and pipes, and in its preferred embodiments more specifically relates to a device for temporarily shutting off the flow of pressurized fluids through a flexible hose or pipe for repair or other work operations.

BACKGROUND

It is increasingly common for flexible pipes and hoses to be used to convey fluids. When an operation such as a repair or a modification, such as the addition of a branch line, is to be performed on a flexible hose or pipe it may not be convenient or feasible to close a permanently installed valve to shut down the flow through the pipe where the repair or other work operation is to be performed. In those instances it is common practice to use a temporary clamping device to flatten the pipe so as to close it to the flow of liquid and allow the work operation to be performed. When the work is completed the clamping device is released to again open the pipe and allow fluid flow to resume. It is important in performing the clamping operation to avoid damage to the pipe, because such damage creates a weak spot in the pipe and increases the likelihood that leaks and other failures will immediately or subsequently develop Devices for temporarily clamping pipes are known in the prior art, but the prior art devices have certain inherent disadvantages and none of them has proved to be completely satisfactory. In one approach two straight members are hinged together at one end, so that the members can be positioned on either side of a pipe, squeezed together to bring them toward parallel orientation so as to flatten the pipe, and then fastened at their free ends by various means. In this design the two members are not brought into completely parallel orientation unless the inner surfaces of the two members are directly in contact with each other. When a pipe is compressed between the two members during use of the device the thickness of the pipe wall prevents the device from being fully closed, and they remain disposed at an angle relative to each other. As a result, the space between them adjacent to the hinge is less than the space between them near their outer ends, and the pipe is not uniformly compressed. When sufficient force is applied to fully close the pipe to fluid flow the portion of the pipe wall nearest the hinge of the device is often excessively compressed and damaged. In some prior art devices the length of the hinged members is increased, to gain additional leverage for compressing the pipe, and also to allow the pipe to be positioned near the free ends of the members to minimize the difference in wall compression across the pipe. However, the additional length can make such devices difficult to use in a confined space, such as a trench, without additional excavation.

SUMMARY OF THE INVENTION

The present invention provides a clamping device that overcomes the disadvantages and drawbacks of the prior art. The device of the invention includes two clamping members or jaws that are hinged at an offset, so that when the device is fully closed the jaws are parallel but spaced apart an appropriate distance to accommodate the thickness of the pipe wall without excessive compression, and with uniform compression across the width of the compressed portion of the pipe. The device of the invention also includes a unique closing and fastening mechanism that greatly facilitates application of controlled force, in confined spaces, to close the pipe without damaging the pipe wall. The structure and features of the device of the invention will be described in detail below, with reference to the accompanying drawing figures.

DESCRIPTION OF THE INVENTION

Figure 1:
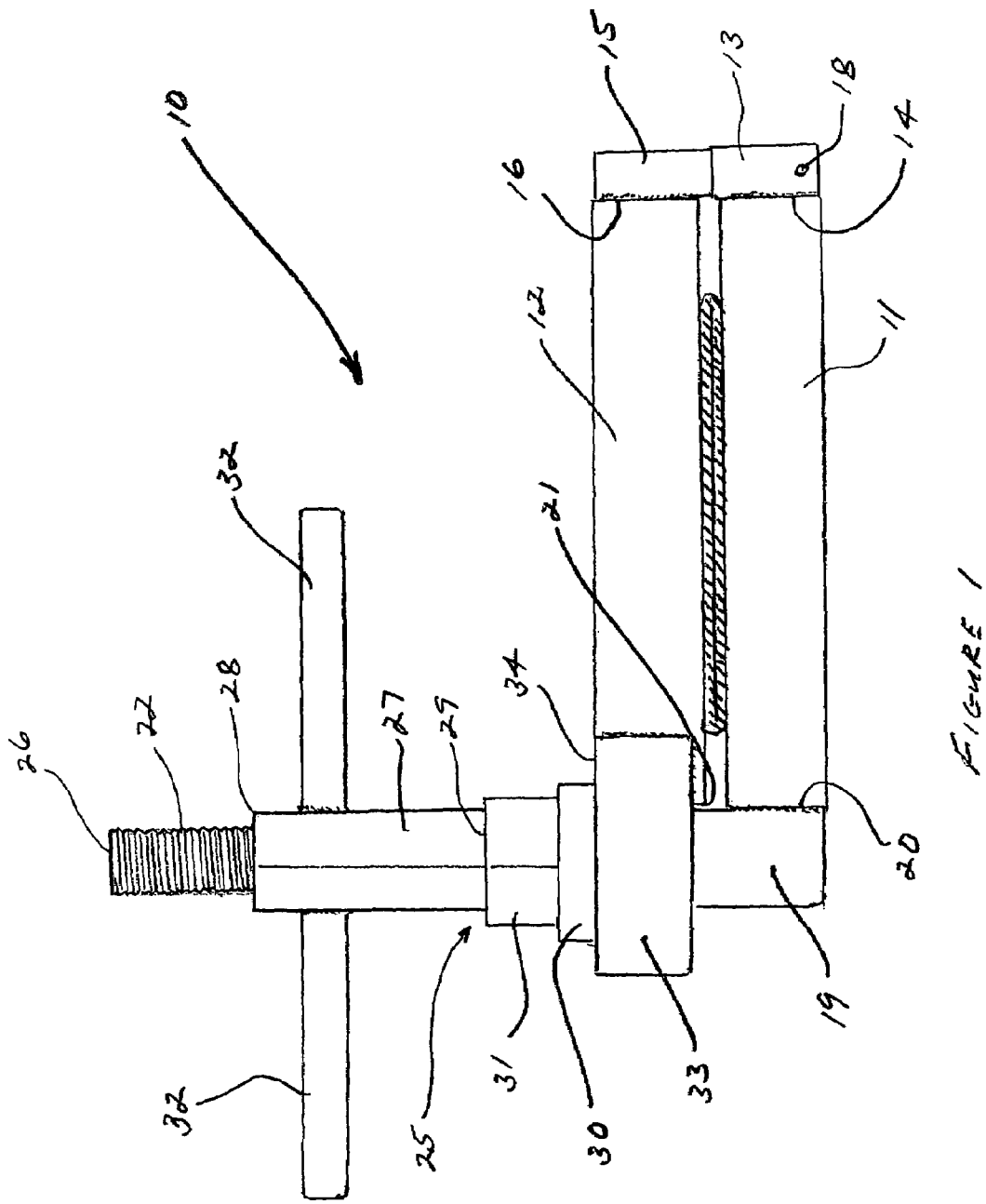
FIG. 1 is a side elevation view of the preferred embodiment of the device of the invention, in closed and latched position, showing a cross-section of a pipe between the jaws of the device.
Figure 2:
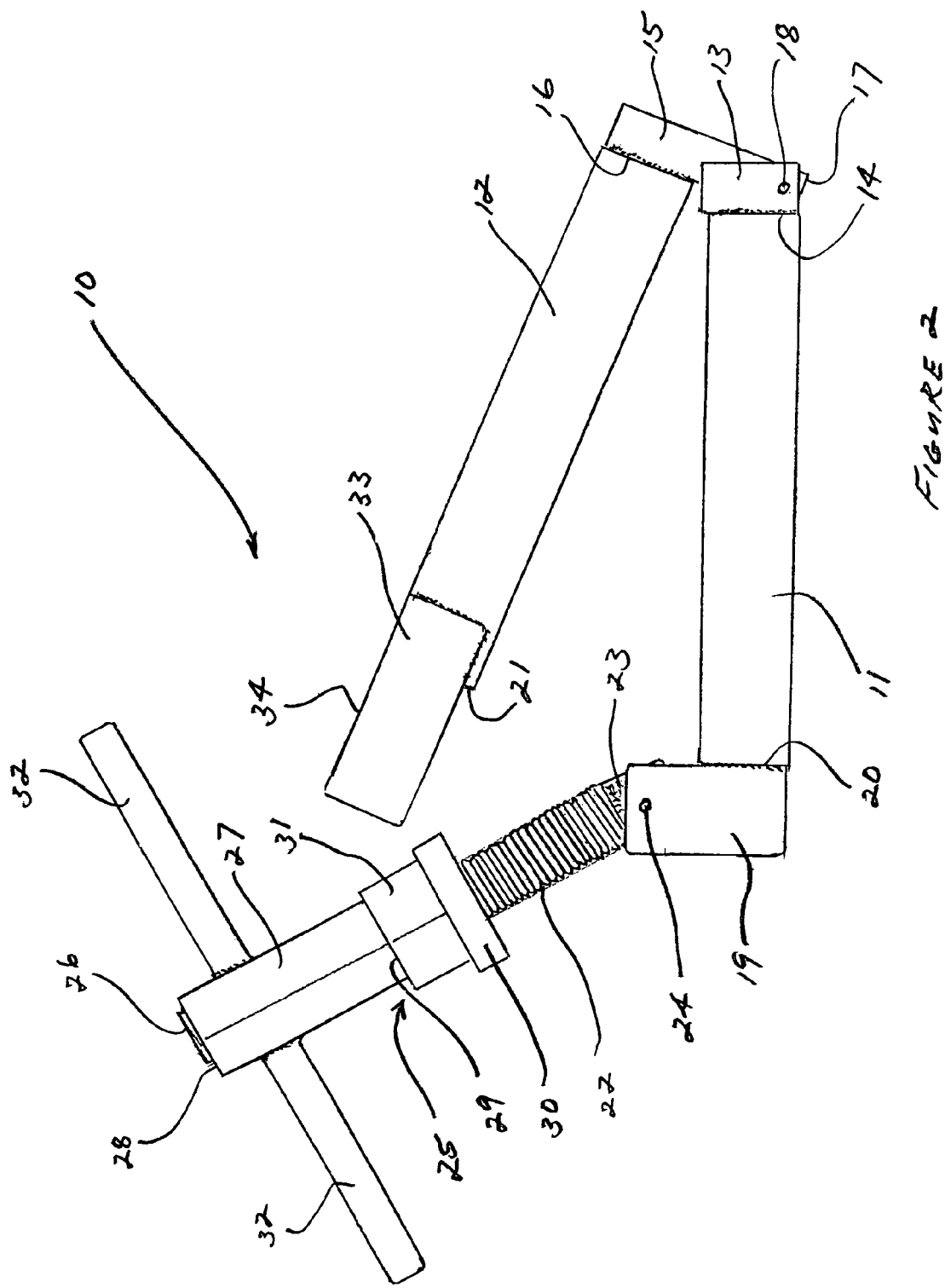
FIG. 2 is a side elevation view of the preferred embodiment of the device of the invention, in an open position.

The preferred embodiment of the clamping device of the invention, generally identified by reference number 10, includes a first, or lower, jaw member 11, and a second, or upper jaw member 12, to be positioned below and above, respectively, a flexible pipe to be compressed and temporarily closed. In the preferred embodiment both jaws 11 and 12 are formed of round steel rods. The round configuration avoids the presence of corners or projections that might damage pipe walls, and the steel material provides sufficient strength and rigidity to avoid deformation of the device and assure maintenance of a secure closure. However, the specific configuration and material of construction are both subject to variation within the scope of the invention, and other configurations and materials could be used if desired. As a non-limiting example, jaws 11 and 12 could be formed of sections of heavy walled pipe rather than solid rods, to reduce the weight of the device, so long as the pipe is of sufficient strength to withstand the forces imposed during use without deformation. It is also preferred that the pipe engaging surfaces of both lower and upper jaws be rounded or otherwise curved to avoid damage to pipe walls and creating a weak point that could lead to premature failure, especially under pressure. In the preferred embodiment lower and upper jaws 11 and 12 are of equal length and of equal cross-sectional dimension.

Two spaced apart parallel hinge plates 13 are securely and rigidly connected to the first end 14 of lower jaw 11. A pivot plate 15 is connected to the first end 16 of upper jaw 12, generally perpendicular to the longitudinal axis of jaw 12. Pivot plate 15 is greater in length than the cross-sectional dimension of jaw 12, and is disposed such that the outer end 17 of the pivot plate extends outwardly from jaw 12. Pivot plate 15 is disposed between hinge plates 13, with the two jaws in parallel, slightly separated orientation, and connected by hinge pin 18 that extends through the hinge plates and pivot plate. Jaws 11 and 12 are thus pivotally connected to each other at a pivot point formed by hinge pin 18. With jaws 11 and 12 disposed parallel to each other, the distance between them is approximately equal to, or slightly less than, twice the wall thickness of the pipes with which the device is to be used. The separation of the pipe engaging surfaces of the jaws is significant in avoiding excessive compression of pipe walls, especially on the hinge side of the jaws, which can also be a cause of damage to the pipe wall and creation of a weakened spot in the pipe.

Two latch hinge plates 19 are securely and rigidly connected to second end 20 of lower jaw 11 in spaced apart, parallel relation to each other, and also in parallel relation to hinge plates 13. Latch hinge plates 19 are preferably of greater length than hinge plates 13, and extend outwardly from lower jaw 11 in a direction perpendicular to the longitudinal axis of jaw 11. With upper jaw 12 disposed parallel to lower jaw 11, latch hinge plates 19 preferably extend partially across the second end 21 of upper jaw 12.

A threaded rod 22, with a flattened first, or lower end 23, is pivotally connected to lower jaw 11 with the flattened lower end 23 of the rod disposed between latch hinge plates 19, and with pivot pin 24 extending through plates 19 and flattened end 23 of the threaded rod. The pivotal connection between threaded rod 22 and latch hinge plates 19 is such that the threaded rod may be pivoted around pin 24 between an orientation generally perpendicular to the longitudinal axis of lower jaw 11 and an orientation extending outward from the second end of lower jaw 11 in generally parallel relation with its longitudinal axis.

A nut assembly 25 is threaded onto rod 22 from its second, or upper, end 26, so that the nut assembly can be rotated to cause it to move along rod 22 as desired. In the preferred embodiment nut assembly 25 includes an elongate nut 27 with an upper end 28 and a lower end 29, and with a central aperture threaded to match the threads of rod 22. Nut 27 is configured so that it can be engaged and turned with a wrench. A hexagonal configuration is preferred, but other configurations could be used. A preferably circular washer, or thrust bearing 30 is disposed at the lower end of the nut assembly, preferably engaged with the nut assembly so that it is free to rotate relative to the nut assembly and also free to rotate around rod 22 without threaded engagement with the rod. Although it is preferred that the thrust bearing be engaged with the nut assembly rather than being independently moveable along rod 22, to facilitate use of the device, a disengaged, separate washer may be used within the scope of the invention if desired. A non-rotating thrust bearing surface at the lower end of the nut assembly could also be used. In the preferred embodiment a second nut 31, of larger cross-sectional dimension than elongate nut 27 and configured to be engaged by a wrench, is disposed between nut 27 and thrust bearing 30, to further facilitate engagement and turning of the nut assembly with a wrench. As with elongate nut 27, a hexagonal configuration is preferred. However, in this embodiment second nut 31 is not an essential element of the device of the invention, and may be omitted if desired. Nut assembly 25 also includes handle 32, disposed adjacent to the upper end 28 of elongate nut 27, for hand tightening and loosening of the nut assembly. In the preferred embodiment handle 32 comprises two rods, connected in opposed parallel relation to nut 27, with each rod extending outwardly from nut 27 in perpendicular relation to its longitudinal axis.

Figure 3:
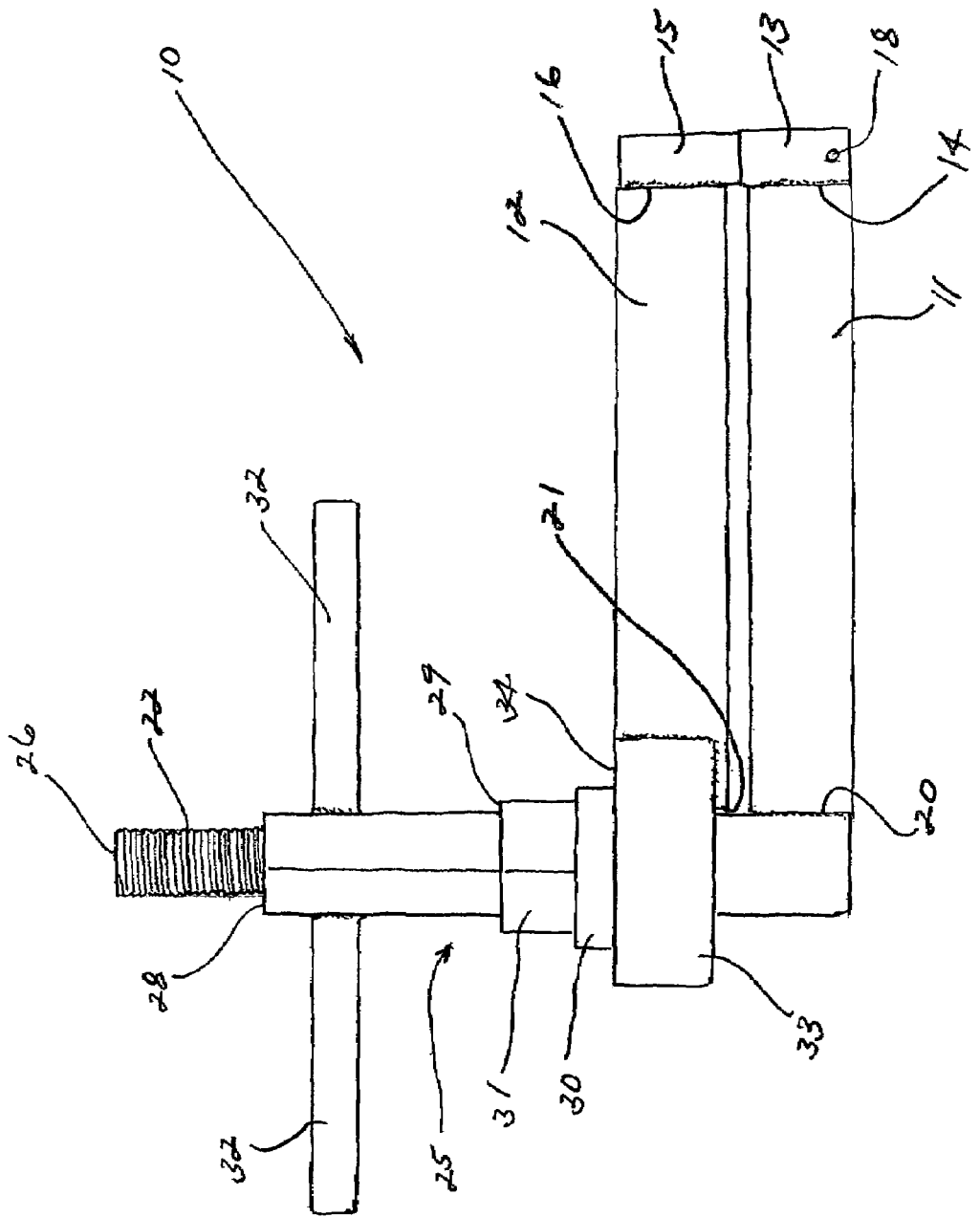
FIG. 3 is a side elevation view of the preferred embodiment of the device of the invention, in a closed position.
Figure 4:
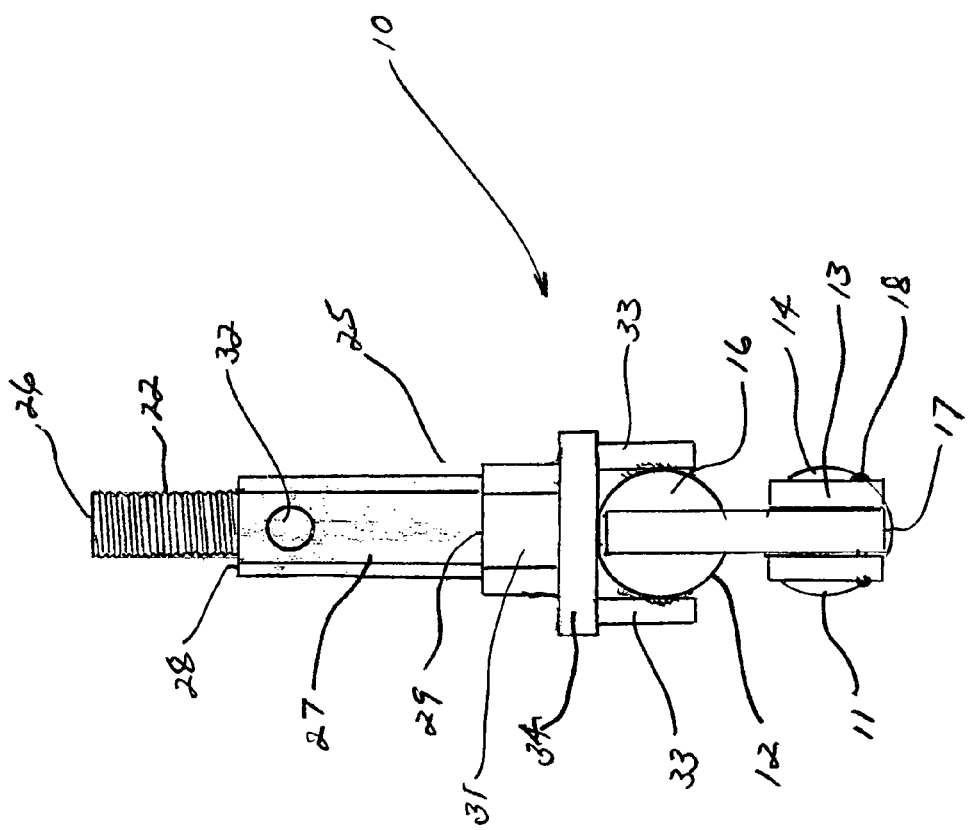
FIG. 4 is an end elevation view of the preferred embodiment of the device of the invention, in closed and latched position, from the hinge end of the device.
Figure 5:
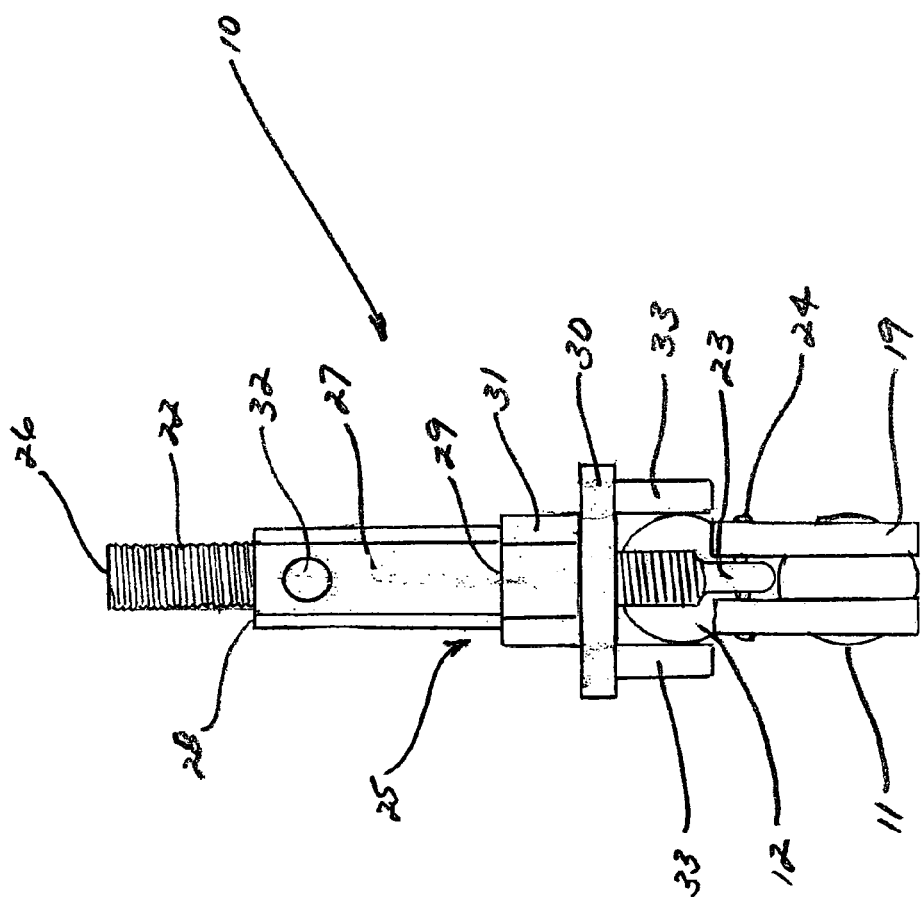
FIG. 5 is an end elevation view of the preferred embodiment of the device of the invention, in closed and latched position, from the latch end of the device.
Figure 6:
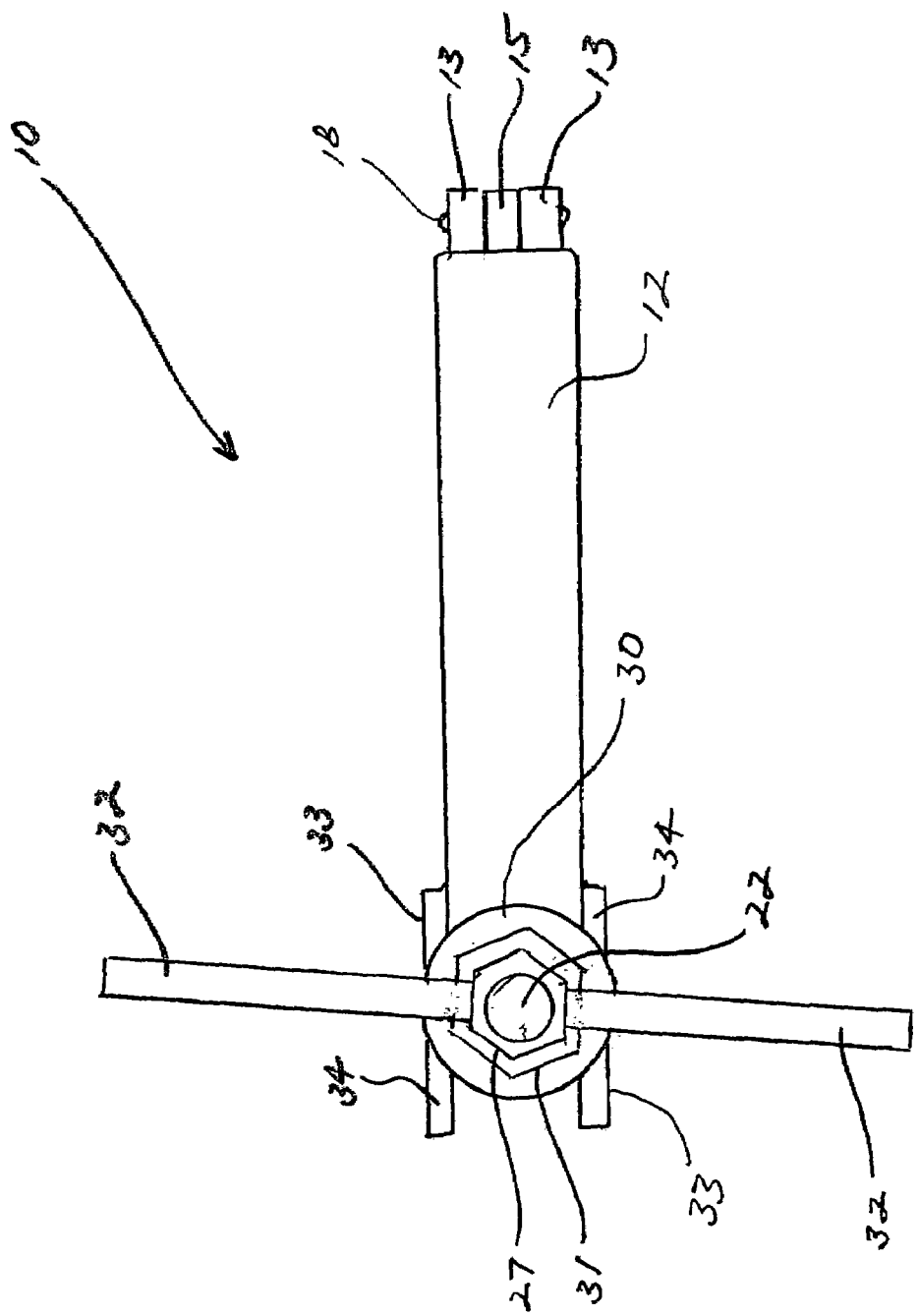
FIG. 6 is a top plan view of the preferred embodiment of the device of the invention, in closed and latched position.

Bearing plates 33 are connected to upper jaw 12 adjacent to its second end 21 and extend outwardly beyond the second end of the upper jaw, to engage the nut assembly for closing and fastening the jaws of the device on a pipe. Plates 33 are preferably connected in opposed relation on either side of upper jaw 12, to receive threaded rod 22 between them when the rod is pivoted to a position generally perpendicular to the longitudinal axis of lower jaw 11. The spacing between plates 33 is sufficient to receive rod 22 between the plates, but less than the diameter of thrust bearing 30, so that the thrust bearing is received against the upper edges 34 of plates 33 with the jaws of the device in position for closing around a pipe, generally in an orientation such as that illustrated in FIG. 3.

Figure 7:
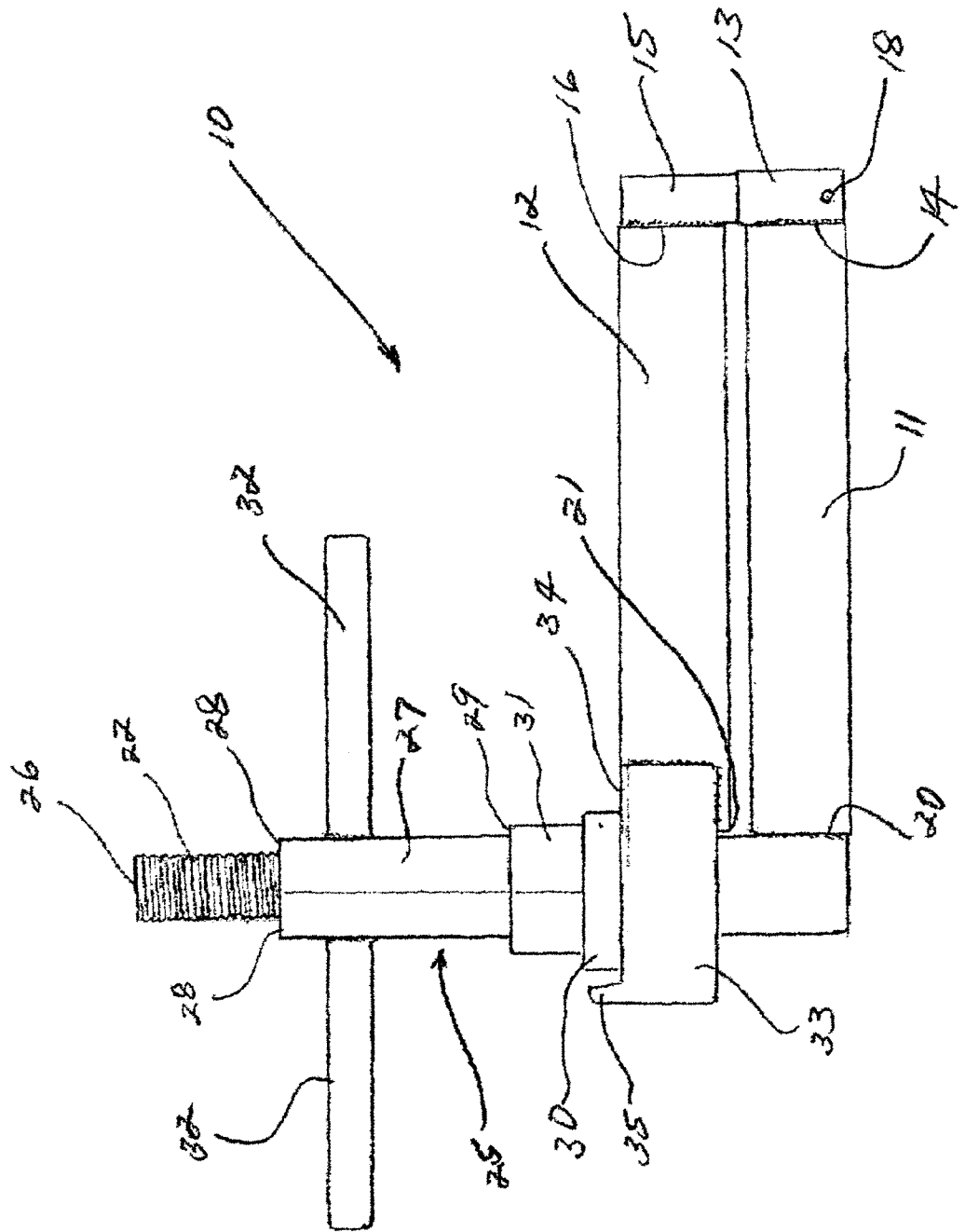
FIG. 7 is a side elevation view of an alternative embodiment of the device of the invention.

The structure of the device is subject to variations and alternative embodiments within the scope of the invention. In one variation or alternative embodiment, illustrated in FIG. 7, bearing plates 32 may be formed with integral tabs 35 extending upwardly above the upper edges of the bearing plates at the outer ends thereof, to retain the thrust washer and prevent the threaded rod 22 and nut assembly 25 from slipping off the bearing plates, providing a secure closure and latching of the device around a pipe.

Figure 8:
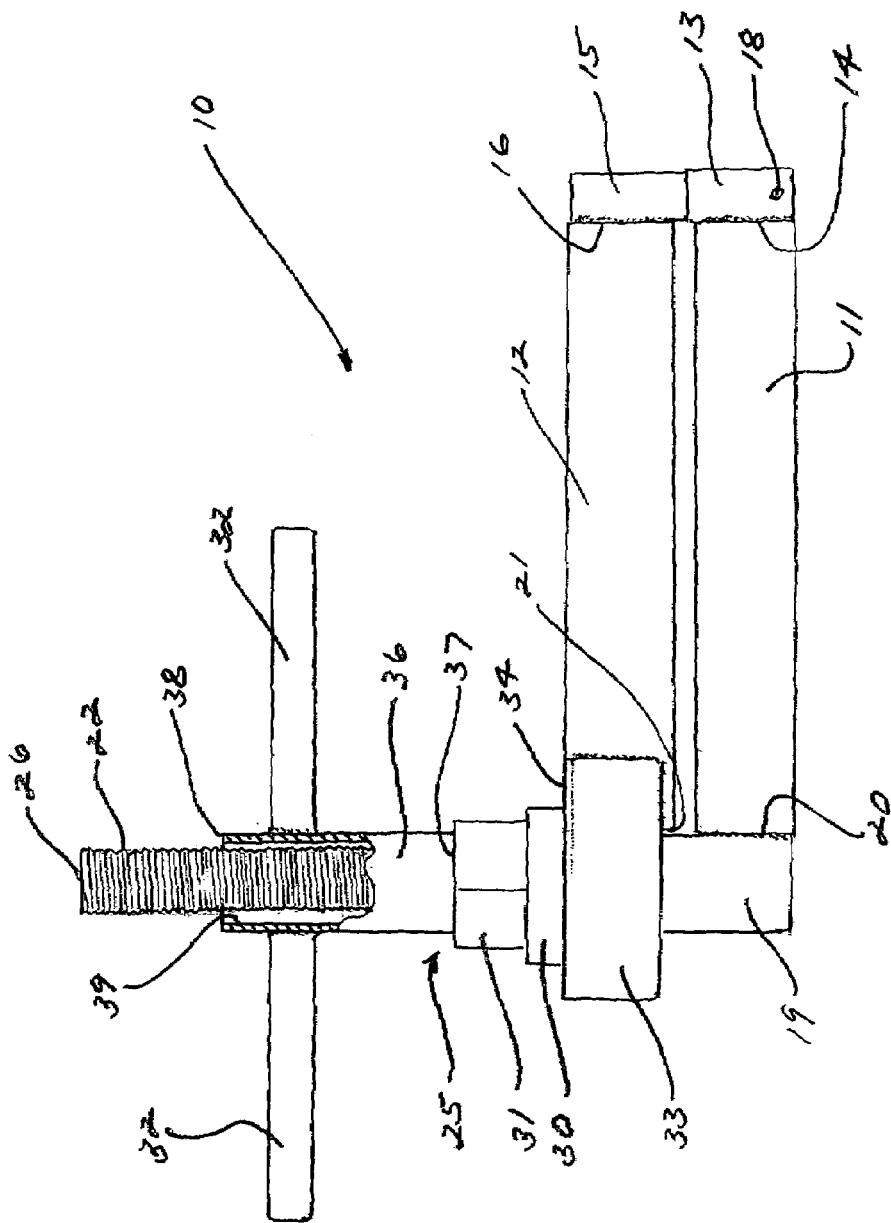
FIG. 8 is a partial side elevation view, partially sectioned, of another alternative embodiment of the device of the invention.

In another alternative embodiment, illustrated in FIG. 8, elongate nut 27 is eliminated and replaced by hollow tube 36 connected at its lower end 37 to nut 31 in coaxial alignment therewith. Handle 32 is connected to tube 36 adjacent to its upper end 38. In this embodiment the interior of tube 36 is not threaded, and the inside cross-sectional dimension of tube 36 is sufficiently larger than the outside dimension of threaded rod 22 to provide clearance between the inner surface 39 of the tube and the threads on rod 22. Nut 31 is threaded onto threaded rod 22 and that threaded engagement is the only means of moving nut assembly 25 along threaded rod 22. As noted above, nut 31 is preferably configured to be engaged by a wrench; e.g., hexagonal.

To use the device of the invention the nut assembly is threaded up the threaded rod, and the nut assembly and threaded rod are pivoted out to disengage them from the bearing plates and upper jaw of the device. The upper and lower jaws are pivoted apart and placed on either side of a flexible pipe in the location of the temporary closure. The jaws are squeezed together by hand to begin compressing the pipe, and the nut assembly and threaded rod are pivoted to bring the threaded rod between the bearing plates an the thrust washer over the upper edges of the bearing plates. The nut assembly is rotated on the threaded rod to force the upper and lower jaws of the device together, compressing and flattening the pipe. The nut assembly is tightened until flow through the pipe is stopped, and work downstream of the temporary closure can be performed. When the work is completed, flow through the pipe is restored by loosening the nut assembly and removing the device from the pipe in a reverse of the closing steps.

Because the pivot point for the upper jaw is offset from the longitudinal axis of the upper jaw, the upper and lower jaws can be brought into completely parallel alignment with a selected spacing between them. The compression of the pipe is uniform across the diameter of the pipe in the final stage of closure, making it much less likely that the pipe wall will be crimped or otherwise damaged. Uneven compression, as would result if the pivot point were not offset so as to maintain spacing between the jaws at full closure, is the most common cause of pipe damage resulting from a temporary closure. The device of the invention is also easier to use than at least most of the devices known in the prior art, especially in a confined space, and makes it easier for a user to control the clamping force applied to a pipe.

The foregoing description of the invention is intended to be illustrative and not limiting. The device of the invention is susceptible to variations and alternative embodiments within the scope of the invention in accordance with the following claims.

The invention claimed is:

1. A device for temporarily closing a flexible pipe against the flow of fluid through the pipe, comprising,
    an elongate first jaw member having a first end and a second end, a pipe engaging surface, and a longitudinal axis;
    an elongate second jaw member having a first end and a second end, a pipe engaging surface, and a longitudinal axis, disposed relative to said first jaw member such that said longitudinal axis of said first jaw member and said longitudinal axis of said second jaw member define a plane, and with said pipe engaging surface of said first jaw member facing said pipe engaging surface of said second jaw member;
    a pair of planar hinge plates disposed in spaced apart parallel relation and connected to said first end of said first jaw member such that said hinge plates extend outwardly from said first end of said first jaw member parallel to said plane defined by said longitudinal axes of said first and second jaw members;
    a planar pivot plate connected to said first end of said second jaw member and extending outwardly therefrom in said plane defined by said longitudinal axes of said first and second jaw members, said pivot plate having an outer end received between and pivotally connected to said hinge plates with said first ends of said first and second jaw members spaced apart from each other in said plane defined by said longitudinal axes of said first and second jaw members and with said pipe engaging surfaces of said first and second jaw members facing each other;
    a pair of planar latch hinge plates disposed in spaced apart parallel relation and connected to said second end of said first jaw member with said latch hinge plates parallel to said hinge plates, said latch hinge plates extending from said second end of said first jaw member perpendicular to said longitudinal axis of said first jaw member so as to extend at least partially across said second end of said second jaw member with said first and second jaw members disposed in parallel relation to each other;
    a pair of planar bearing plates disposed in spaced apart parallel relation and connected to said second jaw member in opposed relation on either side thereof adjacent to said second end thereof with said bearing plates parallel to said pivot plate, said bearing plates extending outwardly from said second end of said second jaw member on either side of said longitudinal axis of said second jaw member;
    an elongate threaded rod with external threads, said rod having a first end and a second end and a longitudinal axis, said first end disposed between and pivotally connected to said latch hinge plates with said threaded rod extending outwardly therefrom with said longitudinal axis of said threaded rod in said plane defined by said longitudinal axes of said first and second jaw members, such that said threaded rod may be pivoted to extend between said bearing plates and outwardly therefrom; and
    a nut assembly including a threaded nut with a central aperture and internal threads, threaded onto said threaded rod with said threads of said nut engaged with said threads of said rod such that said nut assembly is moveable along said rod, said nut assembly receivable against and across said bearing plates with said rod extending between said bearing plates.

2. The device of claim 1, wherein said first and second jaw members are formed of solid rods, each being circular in cross-sectional configuration.

3. The device of claim 2, wherein said solid rods are formed of steel.

4. The device of claim 1, wherein said first and second jaw members are formed of hollow pipe, each being circular in cross-sectional configuration.

5. The device of claim 1, wherein said pipe engaging surfaces of said first and second jaw members are curved.

6. The device of claim 1, wherein said nut of said nut assembly is of non-circular external configuration such that said nut may be engaged and turned with a wrench.

7. The device of claim 1, wherein said nut assembly further includes an elongate cylindrical tube with a hollow interior, a longitudinal axis, a first end, and a second end, said tube connected at said first end to said nut and extending outwardly therefrom such that said threaded rod is received through said hollow interior of said tube when said nut is threaded onto said threaded rod, and wherein said nut assembly further includes an elongate first handle rod with a first end and a second end, connected at said first end to said tube adjacent to said second end thereof and extending outwardly therefrom perpendicular to said longitudinal axis of said tube.

8. The device of claim 7, wherein said nut assembly includes a second handle rod connected to and extending outwardly from said tube in opposed coaxial relation to said handle rod.

9. The device of claim 1, wherein said nut assembly further includes a thrust bearing to be received between said nut and said bearing plates.

10. The device of claim 9, wherein said thrust bearing is connected to said nut so as to rotate with said nut.

11. The device of claim 1, wherein said nut of said nut assembly is elongate with a longitudinal axis, a first end, and a second end, and wherein said nut assembly further includes a pair of elongate handle rods, each having a first end and a second end, each connected at its first end to said nut adjacent to said second end thereof, said handle rods extending outwardly from said nut in opposed relation mutually perpendicular to said longitudinal axis of said nut.

12. The device of claim 11, wherein said nut assembly further includes a second nut of greater cross-sectional dimension than said elongate nut, connected to said first end of said elongate nut.

13. The device of claim 12, wherein said nut assembly further includes an annular thrust bearing connected to said second nut opposite said connection of said second nut to said elongate nut, said thrust bearing to be received between said second nut and said bearing plates.

14. A device for temporarily closing a flexible pipe against the flow of fluid through the pipe without damaging the wall of the pipe, comprising, an elongate first jaw member having a first end and a second end, a rounded pipe engaging surface, and a longitudinal axis;

an elongate second jaw member having a first end and a second end, a rounded pipe engaging surface, and a longitudinal axis, disposed relative to said first jaw member such that said longitudinal axis of said first jaw member and said longitudinal axis of said second jaw member define a plane, and with said pipe engaging surface of said first jaw member facing said pipe engaging surface of said second jaw member;

a pair of planar hinge plates disposed in spaced apart parallel relation and connected to said first end of said first jaw member such that said hinge plates extend outwardly from said first end of said first jaw member parallel to said plane defined by said longitudinal axes of said first and second jaw members;

a planar pivot plate connected to said first end of said second jaw member and extending outwardly therefrom in said plane defined by said longitudinal axes of said first and second jaw members, said pivot plate having an outer end received between and pivotally connected to said hinge plates so as to pivotally connect said first and second jaw members with pipe engaging surfaces of said first and second jaw members at said first ends of said first and second jaw members in facing separated relation to each other in said plane defined by said longitudinal axes of said first and second jaw members;

a pair of planar latch hinge plates disposed in spaced apart parallel relation and connected to said second end of said first jaw member with said latch hinge plates parallel to said hinge plates, said latch hinge plates extending from said second end of said first jaw member perpendicular to said longitudinal axis of said first law member so as to extend at least partially across said second end of said second jaw member with said first and second jaw members disposed in parallel relation to each other;

a pair of planar bearing plates disposed in spaced apart parallel relation and connected to said second jaw member in opposed relation on either side thereof adjacent to said second end thereof with said bearing plates parallel to said pivot plate, said bearing plates extending outwardly from said second end of said second jaw member on either side of said longitudinal axis of said second jaw member;

an elongate threaded cylindrical rod with external threads, said rod having a first end and a second end and a longitudinal axis, said rod having a flattened portion extending a short distance from said first end toward said second end, said flattened portion disposed between and pivotally connected to said latch hinge plates with said threaded rod extending outwardly therefrom with said longitudinal axis of said threaded rod in said plane defined by said longitudinal axes of said first and second jaw members, such that said threaded rod may be pivoted to extend between said bearing plates and outwardly therefrom; and a nut assembly including a threaded nut with a central aperture and internal threads, threaded onto said threaded rod with said threads of said nut engaged with said threads of said rod such that said nut assembly is moveable along said threaded rod, an elongate tube with a hollow interior, a longitudinal axis, and fist and second end, connected at said first end to said nut around said central aperture such that said tube extends over said threaded rod without engagement therewith, and a pair of elongate handle rods each having a first end and a second end, each connected at said first end to said tube adjacent to said second end of said tube and extending outwardly therefrom perpendicular to said longitudinal axis of said tube, said nut assembly receivable against and across said bearing plates with said threaded rod extending between said bearing plates.

15. The device of claim 14, wherein said first and second jaw members are formed of solid rods, each with a circular cross-sectional configuration.

16. The device of claim 14, wherein said first and second jaw members are formed of hollow pipe, each with a circular cross-sectional configuration.

17. The device of claim 16, wherein said first and second ends of said first and second jaw members are closed.

18. The device of claim 14, wherein said nut assembly further includes a thrust bearing connected to said nut to be received between said nut and said bearing plates.

19. The device of claim 14, wherein each of said bearing plates includes a tab extending outwardly therefrom perpendicular to said longitudinal axis of said second jaw member, to retain said nut assembly relative to said bearing plates.

* * * * *